Patented Feb. 16, 1937

2,071,130

UNITED STATES PATENT OFFICE 2,071,130

DYESTUFFS OF THE PYRONE SERIES

Hans Krzikalla and Paul Garbsch, Ludwigshafen-on-the-Rhine, Germany, assignors to General Aniline Works, Inc., New York, N. Y., a corporation of Delaware No Drawing. Application February 25, 1935, Serial No. 8,210. In Germany March 9, 1934

2 Claims. (Cl. 260—46)

The present invention relates to dyestuffs of the pyrone series and a process of producing same.

We have found that valuable dyestuffs are obtained by preparing dyestuffs of the pyrone series corresponding to the general formula:

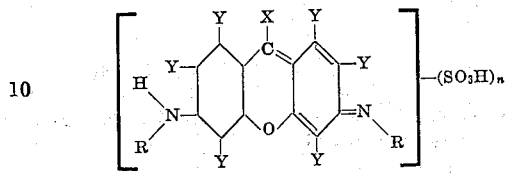

in which R stands for a cyclic radicle containing more than two rings, X for an alkyl or aryl group containing a carboxylic acid group, up to two Y's stand for halogen the other Y's being hydrogen and n for a whole number up to 4.

The said dyestuffs may be obtained by various methods. They may be obtained for example by the condensation of fluoresceine chloride dichlorfluorane

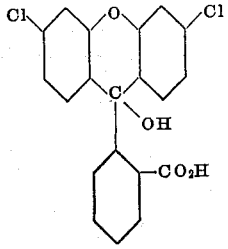

fluoresceine bromide or their substitution products with the folowing amines with subsequent sulfonation:—aminodiphenylbenzenes, aminohydroxydiphenylbenzenes, aminophenylnaphthalenes, aminodinaphthyls, aminofluorenes, aminofluoranthenes, aminochrysenes, aminopyrenes, aminoacenaphthenes, 1-aminocarbazole, 2-aminocarbazole, 3-amino-N-ethylcarbazole, and substitution products of the same. The dyestuffs may also be prepared by condensing phthalic anhydride or its derivatives, as for example chlorinated phthalic anhydride, with aryl-meta-aminophenols (obtainable from resorcinol and the said amines), sulfonation being effected simultaneously or subsequently. The dyesuffs may also be prepared by way of the corresponding 4-arylamido-meta-hydroxy - ortho-benzoyl-benzoic acids by condensation with aryl-meta-aminophenols. By suitable selection of the components, unsymmetrical dyestuffs may also be obtained. Further dyestuffs of the said kind are obtained by employing succinic anhydride instead of phthalic anhydride for condensation with the aryl-meta-aminophenols. The compounds employed for this method of preparation may contain other substituents, such as OH, NO₂, NH₂ or alkyl groups, in addition to the groups necessary for the reaction.

The following examples will further illustrate how the said invention may be carried out in practice but the invention is not restricted to these examples. The parts are by weight.

Example 1

A mixture of 150 parts of 2-aminocarbazole, 150 parts of fluoresceine chloride, 500 parts of quinoline and 100 parts of zinc chloride is heated for 3 hours at from 170° to 180° C. and for 1 hour at from 220° to 230° C. while stirring well. For the purpose of purification the reaction product is extracted several times with hot dilute hydrochloric acid and the dried dyestuff is further extracted with organic solvents. Sulfonation is then effected in the usual manner, as for example with concentrated sulfuric acid as about 20° C., a dyestuff thus being obtained which contains about two sulfonic acid groups in its molecule. It dyes silk, viscose artificial silk, cotton, wool and mixed fabrics of viscous artificial silk and cotton clear greenish blue shades of good fastness to light.

The same dyestuff is obtained by the condensation of two molecular proportions of carbazyl-meta-aminophenol (prepared from 2-aminocarbazole and resorcinal) with one molecular proportion of phthalic anhydride.

The same dyestuff is also obtained by the condensation of 4-carbazyl-amino-ortho-hydroxy-benzoyl-benzoic acid

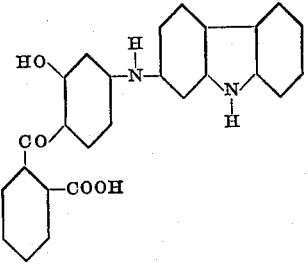

with carbazyl-meta-aminophenol

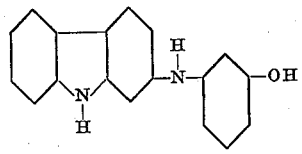

and sulfonation.

By employing dichlorfluoresceine chloride instead of fluoresceine chloride, or by employing 1-aminocarbazole or 3-amino-N-ethylcarbazole instead of 2-aminocarbazole, dyestuffs giving similar shades are obtained. If the sulfonation is carried out under stronger conditions, dyestuffs containing three or four sulfonic acid groups can be obtained.

*Example 2*

100 parts of amino-2-phenylnaphthalene and 75 parts of fluoresceine chloride are heated for from two to three hours at 225° C. in the presence of 100 parts of zinc chloride. The pulverized melt may be sulfonated directly or after previous purification. A dyestuff is thus obtained which dyes the fibrous materials specified in Example 1 violet shades.

*Example 3*

A mixture of 180 parts of 3-aminopyrene, 120 parts of fluoresceine chloride, 150 parts of zinc chloride and 450 parts of quinoline is heated for 2½ hours at 205° C. and then for 2½ hours at 230° C. The melt is then purified as described in Example 1 and sulfonated with sulfuric acid monohydrate. The resulting dyestuff dyes viscous artificial silk, natural silk and cotton blue-green shades.

*Example 4*

A mixture of 114 parts of 3-amino-(N-3'-hydroxyphenyl)-pyrene (obtainable by condensing 3-aminopyrene with resorcinol in the presence of boric acid), 16 parts of succinic anhydride and 14 parts of zinc chloride is heated for 2 hours at from 150° to 160° C. and then for 3 to 5 hours at 170° C. while stirring. After cooling, the reaction mass is pulverized and extracted several times with hot dilute sodium hydroxide solution and then with hot dilute hydrochloric acid. The dyestuff thus purified is dried and then treated with concentrated sulfuric acid at about 20° C. It dyes silk green shades of good fastness to water.

What we claim is:

1. Dyestuffs of the pyrone series corresponding to the general formula:

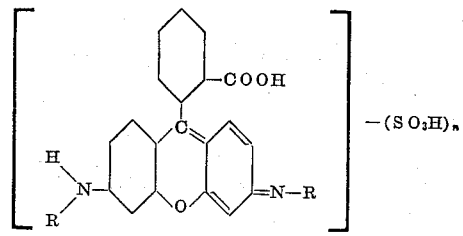

in which R stands for the radicle of a carbazole and $n$ for a whole number up to 4.

2. The dyestuff of the pyrone series corresponding to the formula:

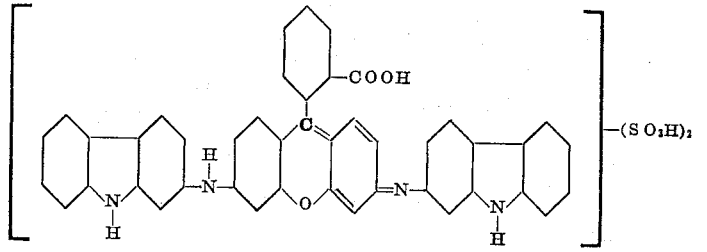

HANS KRZIKALLA.
PAUL GARBSCH.